United States Patent Office 3,334,292
Patented Aug. 1, 1967

3,334,292
POWER SUPPLY CIRCUIT ARRANGEMENTS
Kenneth G. King, King's Cross, London, and Kenneth M. Watkins, Shepperton, Middlesex, England, assignors to Westinghouse Brake and Signal Company, Limited, London, England
Continuation of application Ser. No. 223,058, Sept. 12, 1962. This application June 14, 1966, Ser. No. 557,590
Claims priority, application Great Britain, Sept. 28, 1961, 34,891/61
8 Claims. (Cl. 321—45)

This invention relates to power supply circuit arrangements and relates especially but not exclusively to inverter circuit arrangements for producing a controllable output voltage.

This application is a continuation of our previous application, Ser. No. 223,058, filed Sept. 12, 1962, now abandoned.

According to the present invention there is provided an electrical power supply circuit arrangement having at least two switching devices each of the type which is rendered conducting on application of switching signals thereto and is subsequently rendered non-conducting when the current therein tends to reverse, a commutating capacitor or capacitors being provided such that in operation, as one device becomes conducting a device already conducting becomes non-conducting, and wherein means is provided for progressively increasing and decreasing in cyclic manner the intervals between the application of switching signals to said one or more switching devices to produce a mean output voltage which has a desired fluctuating voltage component of substantially lower frequency than the switching frequency of said switching device or devices.

In order that the invention may be clearly understood and readily carried into effect, the same will be further described, by way of example only, with reference to the accompanying drawings.

Figure 1:
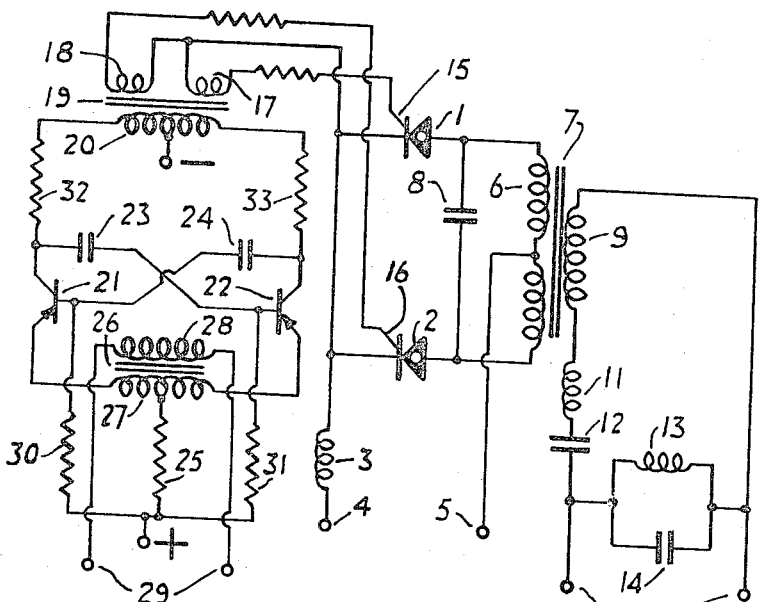
FIG. 1 illustrates one embodiment of an inverter circuit arrangement according to the invention.

Referring to FIG. 1, the circuit arrangement shown comprises three essential parts, a basic inverter circuit, a circuit arrangement for applying switching pulses at cyclically varying intervals to the switching devices of the inverter circuit and a filter circuit for filtering out the desired alternating voltage output component. The inverter circuit comprises two controllable semi-conductor rectifier devices 1 and 2 of the type which are rendered conducting on application of triggering pulses thereto and are subsequently rendered non-conducting when the current carried thereby tends to reverse. These switching devices each have a corresponding terminal connected via an inductance 3 to one D.C. input terminal 4, the other D.C. input terminal 5 being connected to a center tapping on the primary winding of 6 of a transformer 7, the terminals of 6 being connected respectively to the other terminals of 1 and 2, and being coupled together via a capacitor 8. The transformer 7 has a secondary winding 9, the terminals of which are connected to a pair of A.C. output terminals 10 via a series tuned acceptor circuit comprising an inductance 11 and a capacitor 12, and a tuned shunt rejector circuit comprising inductance 13 and capacitor 14. Both these circuits are tuned to the desired frequency of the output. Instead of taking the above form, the filter may be of any other suitable form. Thus the filter may for example comprise a simple low-pass filter with a series inductor and shunt capacitor which may be omitted if the presence of high frequency components in the output is not objectionable.

The gating input terminals 15 and 16 respectively of 1 and 2 are coupled to respective secondary windings 17 and 18 of a transformer 19, the primary winding 20 of which is included in a multivibrator circuit having a pair of transistors 21 and 22. This multivibrator circuit is of conventional form, the base electrodes and collector electrodes of 21 and 22 being cross-coupled via capacitors 23 and 24, and the emitter electrodes being connected via respective halves of winding 27 of a transformer 26 and a common resistor 25 to the positive source terminal. The other winding 28 of 26 has its terminals connected to a pair of control terminals 29 to be referred to hereafter. The base electrodes of 21 and 22 are connected via respective resistors 30 and 31 to the aforesaid positive source terminal, the negative source terminal being connected to the center tapping of 20, the terminals of which are connected via respective resistors 32 and 33 to the collector electrodes of 21 and 22.

In operation of the circuit arrangement shown in FIG. 1, the operation of the basic inverter circuit will first be considered. In this circuit switching devices 1 and 2 are rendered conducting alternately by the application of a gating voltage to their respective triggering electrode 15 or 16 and each switching device is subsequently rendered non-conducting by the charge acquired by the capacitor 8 upon the other switching device being rendered conducting. Thus, the voltage developed across the secondary winding 9 is of one polarity or the other depending upon the states of conduction of 15 and 16 and has a magnitude proportional to the applied voltage. Apart furthermore from what may be regarded as intermediate transient conditions, greater or lesser magnitudes of output voltage do not occur. Thus, if 1 or 2 are rendered conducting at regular intervals a steady alternating voltage which is ideally of a rectangular waveform results across 9. In accordance with the invention, however, by virtue of the fact that the gating inputs of 15 and 16 are derived from the aforementioned multivibrator circuit comprising 21 and 22, the intervals between triggering impulses to 1 and 2 are varied cyclically to produce a cyclic variation in mean output voltage across 9. In this way if the cyclic variation is of the desired output frequency which is substantially less than the switching frequency of 1 and 2 a mean inverter output of this frequency is produced and is filtered out by the filter circuit comprising 11, 12, 13 and 14.

The cyclic variation of intervals between switching impulses to 15 and 16 is achieved by applying a sinusoidal control voltage at the terminals 29. When the control voltage is instantaneously zero the operation of the multivibrator is symmetrical and the output from the inverter is a symmetrical alternating voltage at a relatively high frequency, namely, the frequency of operation of the multi-vibrator. This frequency is virtually completely attenuated by the filter between 9 and 10. When, however, the control voltage is of an instantaneous magnitude other than zero, the multivibrator is rendered assymmetrical in operation by virtue of the differential bias current on the emitters of 21 and 22 and the output of the inverter is similarly assymmetrical, having a mean value depending on the degree of assymmetry. Thus, if the sinusoidal control voltage has 50 cycles per second, the output voltage of the inverter appearing at the terminals 10 also varies substantially sinusoidally at 50 cycles per second. If desired, the output voltage waveform appearing at 10 may be improved by providing negative feed back, that is a fraction of the voltage at 10 may be connected in series with and in opposition to the control voltage at 29, the fraction of voltage of 10 employed being dependent on the degree of negative feed back required.

Figure 2:
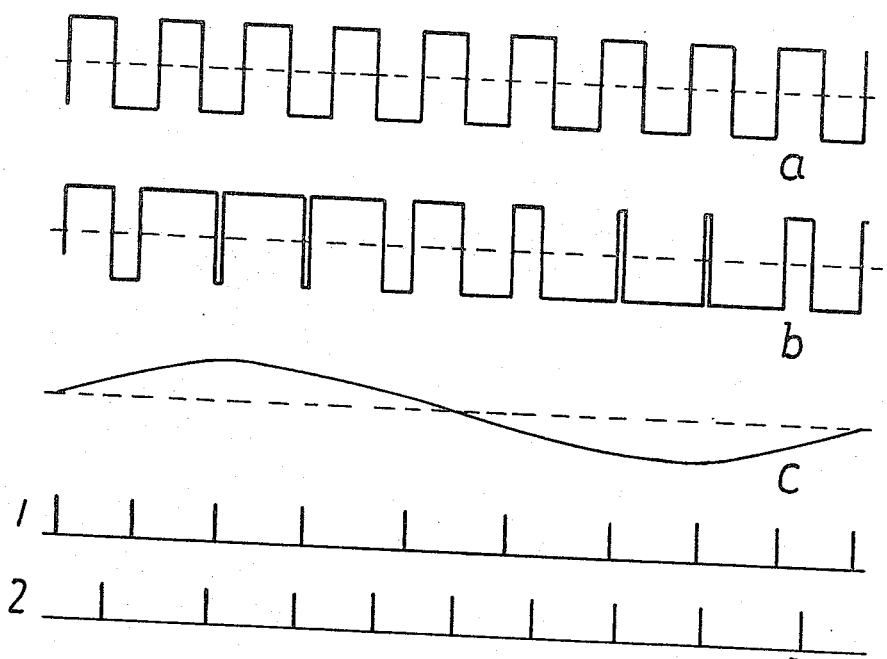
FIG. 2 illustrates wave-forms to be referred to in connection with FIG. 1.

Referring to FIG. 2 the waveform shown at (a) illustrates the nature of the output voltage appearing across 9 with a zero control voltage across 28. The waveform shown at (b) illustrates the nature of the output appearing across 9 when a non-zero value of control voltage is applied across 28, it being appreciated that for the sake of clarity the switching frequency illustrated is substantially less than would in practice be so. After the waveform (b) has been applied to the filter circuit referred to, the output waveform appearing at 10 may be as shown at (c). The switching pulses applied at 15 and 16 which are produced by the multivibrator, are shown on a time scale at (d) and serve to illustrate the manner of cyclic variation of the intervals therebetween to produce the waveform (c).

Figure 3:
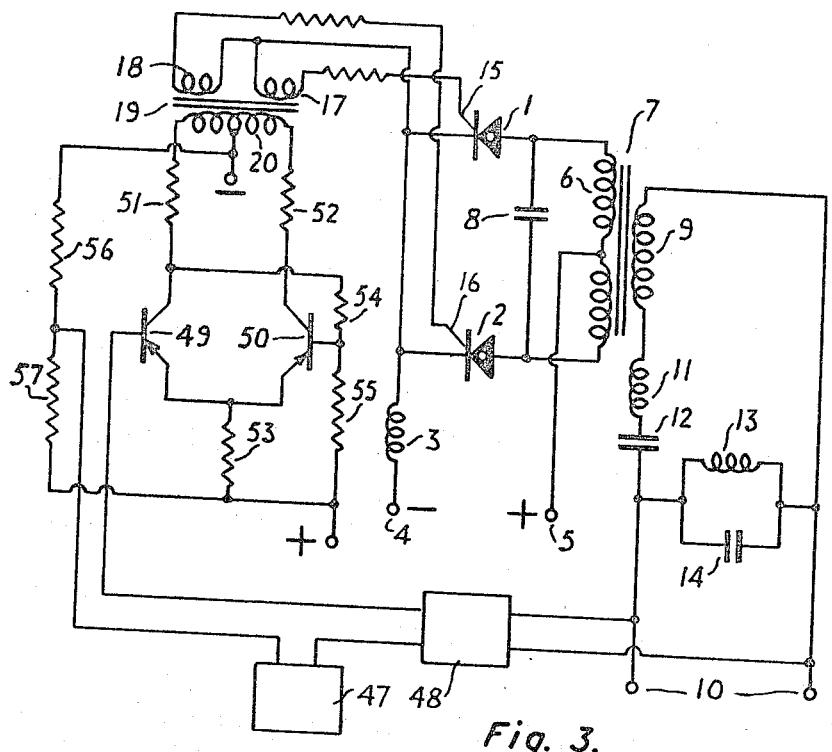
FIG. 3 illustrates a further embodiment of an inverter circuit arrangement according to the invention.

Referring to FIG. 3 those components which correspond to the components used in the circuit arrangement of FIG. 1 are allocated the same reference numerals. This applies to the basic inverter circuit the output filter and the driver transformer for the controllable rectifiers in the inverter. Instead of a multivibrator as used in FIG. 1 the triggering signals to 1 and 2 are derived as a result of the switching over of a bistable circuit from one stable state to another. This switching over is achieved by comparing a fraction of the output signal at 10, as derived from a potentiometer 48, with a reference waveform from an oscillator 47 which is timed to oscillate at the desired output supply frequency and the difference signal is employed to switch the bistable circuit one way or the other. The bistable circuit comprises a pair of transistors 49 and 50 intercoupled in known manner with associated resistors 51, 52, 53, 54 and 55 as shown, such that when 49 is conducting 50 is substantially non-conducting and vice versa.

It will be appreciated that in the arrangement shown in FIG. 3, when the instantaneous difference beween the fraction of the output waveform and that produced by the reference oscillator 47 is positive by a given amount the bistable circuit assumes one state and when it subsequently becomes negative by a given amount the bistable circuit is switched over to its other state to produce a triggering pulse to that one of 1 or 2 which on conducting will reduce the difference the other way. The effect is such therefore as to increase and decrease in cyclic manner the intervals between the application of switching signals to the controllable rectifiers 1 and 2 to cause the output waveform to oscillate about the desired mean output waveform as in the arrangement of FIG. 1.

In both the arrangements for controlling the rectifier devices as described above, the amplitude as well as the actual waveform of the output voltage may be controlled by the control or reference voltage.

Although the invention has been described above with reference to a particular form of inverter circuit employing two controllable rectifier devices, the invention may equally well be applied to inverters of the bridge type or transformer coupled type, incorporating a greater number of switching devices. Furthermore, a number of inverter circuits may be employed in combination to form a polyphase inverter. Again, different methods of commutation may be employed in inverters for the purposes of the present invention and if desired diodes may be incorporated to improve the voltage regulation and to permit the flow of reactive currents in the load.

Figure 4:
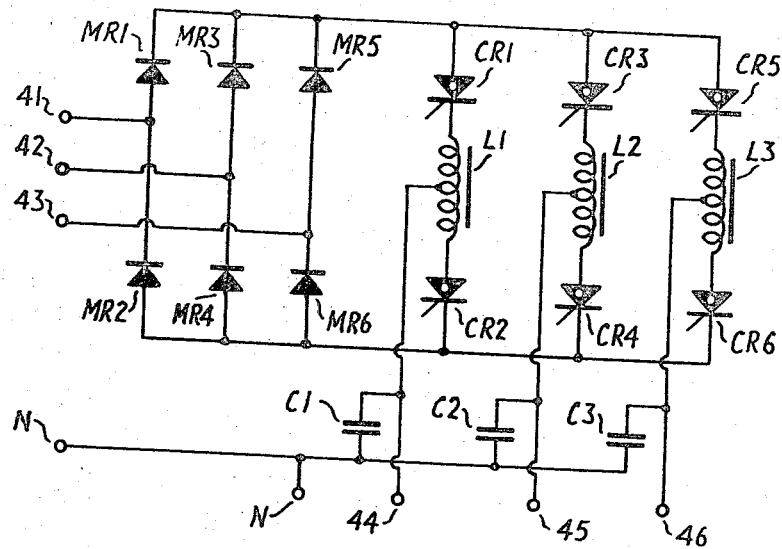
FIG. 4 illustrates an arrangement according to the invention to produce a 3-phase output from a 3-phase supply of different frequency.

Referring to FIG. 4, this illustrates a polyphase inverter circuit arranged to produce a three phase output from a three phase A.C. supply of different frequency. Three basic inverters are employed in which the commutation is effected by means of center-tapped chokes L1, L2 and L3 respectively, each of which has an associated pair of controllable rectifier devices. Upon the respective non-conducting controlled rectifier device being rendered conducting, each choke by virtue of its transformer action and the charge on a corresponding capacitor C1, C2 or C3 as the case may be, produces a positive voltage at the respective cathode, or a negative voltage at the anode, of the respective other controllable rectifier device, which is thereby rendered non-conducting. The controllable rectifier devices associated with L1, L2, and L3 are represented respectively by CR1, CR2 CR3, CR4 and CR5 CR6. The direct currents supplied to these pairs of devices are derived via respective pairs of rectifiers MR1, MR2, MR3, MR4 and MR5 MR6 the junctions between respective ones of which are connected to the supply terminals 41, 42 and 43 to which the three phase supply of different frequency is connected. The three phase output is derived between the three phase common terminal N and the respective center tappings of L1, L2 and L3, which are taken to output terminals 44, 45 and 46. Each pair of controllable rectifier devices is controlled by a circuit such as that illustrated with reference to FIG. 1 or FIG. 3 by sensing the output voltage, the control or reference voltages for the three phases being 120° apart in each phase.

What is claimed is:
1. An alternating current power supply circuit including an inverter having an output circuit and a control circuit, said inverter including two switching means operably connected for alternately connecting a source of unidirectional current to said output circuit, said control circuit having outputs connected to said switching means to render each of them alternately conducting and non-conducting at a predetermined cyclic switching frequency, and further comprising varying means for periodically varying the duration of the ON period of each switch to the OFF period of the same switch during the switching cycle, the said varying means operating to increase and decrease the proportion of ON time to OFF time of a given switch in a cyclic manner, the frequency of which cycle is substantially less than the switching frequency at which each switch is rendered conducting.

2. The invention of claim 1 in which said control circuit is a multivibrator being biased in one of its states by being connected to a reference waveform source applied to the input of the multivibrator.

3. The invention of claim 1 in which a tuned circuit is connected across said output circuit and is tuned to the frequency of the switching means.

4. The invention of claim 2 in which a potentiometer is connected across said output circuit to develop a fractional amount of the waveform of the output circuit, and an oscillator for controlling the energization of said multivibrator.

5. The invention of claim 1 in which the inverter includes additional switching means operably connected for polyphasially connecting a source of unidirectional current to said output circuit, said control circuit having respective polyphasial outputs connected to said switching means having respective polyphasial inputs for rendering them polyphasially conducting, and said further means including polyphasially varying the relative ON-to-OFF periods of the switching means at a polyphasial frequency substantially less than the switching frequency at which they are rendered conducting.

6. An alternating current power supply circuit including an inverter having an output circuit, a control circuit and power input circuit, circuit switching devices each having a gating input terminal controlled by said control circuit, said control circuit comprising a multivibrator network of capacitively cross-coupled base and collector electrodes of a pair of transistors, the emitter electrodes of said transistor pair being transformer coupled to a positive terminal of a source, said collector electrodes being connected to the negating terminal of said source through a primary winding of a switching transformer, the secondary winding of the switching transformer providing oppositely phased signals to gating input terminals of said circuit switching devices at a predetermined cyclic switching frequency, a series tuned acceptor circuit and a shunt tuned rejector circuit in said output circuit being tuned to an output frequency substantially less than said switching frequency, and said circuit switching devices comprising semiconductor rectifier devices and energized from a further D.C. source.

7. The invention of claim 1 wherein said switching means are controllable rectifiers which remain conducting until the current therethrough tends to reverse, and including a commutating capacitor connected to each said rectifier to become charged when one of said rectifiers is conducting and wherein when the other of said rectifiers is rendered conducting, the capacitor is connected across said one conductor to render it non-conducting.

8. An alternating current power supply circuit including an inverter having an output circuit and a control circuit, said inverter including two switching means operably connected for alternately conducting a source of unidirectional current to said output circuit, said control circuit having outputs connected to said switching means to render each of them alternately conducting and non-conducting at a predetermined cyclic switching frequency, and further comprising varying means for periodically varying the duration of the ON period of each switch relative to the OFF period of the same switch during the switching cycle, the said varying means operating to increase the duration of the ON time of one switch while simultaneously causing a complementary decrease in the ON time of the other switch in a cyclic manner, the frequency of which cycle is substantially less than the switching frequency at which each switch is rendered conducting.

References Cited

UNITED STATES PATENTS

| | | | |
|---|---|---|---|
| 2,959,725 | 11/1960 | Younkin | 321—45 |
| 2,990,516 | 6/1961 | Johannessen | 330—10 |
| 3,210,638 | 10/1965 | Walker | 321—18 |

JOHN F. COUCH, *Primary Examiner.*

G. GOLDBERG, *Assistant Examiner.*